(12) United States Patent
Chiono

(10) Patent No.: US 11,929,693 B2
(45) Date of Patent: Mar. 12, 2024

(54) METHOD AND SYSTEM FOR CONTROLLING AN ELECTRIC MACHINE

(71) Applicant: MAVEL EDT S.P.A., Pont Saint Martin (IT)

(72) Inventor: Denny Chiono, Pont Saint Martin (IT)

(73) Assignee: MAVEL EDT S.P.A., Pont Saint Martin (IT)

(*) Notice: Subject to any disclaimer, the term of this patent is extended or adjusted under 35 U.S.C. 154(b) by 0 days.

(21) Appl. No.: 17/788,295

(22) PCT Filed: Dec. 31, 2019

(86) PCT No.: PCT/IT2019/000122
§ 371 (c)(1),
(2) Date: Jun. 23, 2022

(87) PCT Pub. No.: WO2021/137259
PCT Pub. Date: Jul. 8, 2021

(65) Prior Publication Data
US 2023/0036654 A1 Feb. 2, 2023

(51) Int. Cl.
*H02P 6/08* (2016.01)
*H02P 21/18* (2016.01)
(Continued)

(52) U.S. Cl.
CPC ............... *H02P 21/20* (2016.02); *H02P 6/08* (2013.01); *H02P 21/18* (2016.02); *H02P 21/22* (2016.02); *H02P 27/06* (2013.01); *H02P 2207/05* (2013.01)

(58) Field of Classification Search
CPC .......... H02P 21/20; H02P 21/18; H02P 21/22; H02P 6/08; H02P 27/06; H02P 2207/05
(Continued)

(56) References Cited

U.S. PATENT DOCUMENTS

2012/0278007 A1* 11/2012 Schleser ............... H02P 21/20
702/44

FOREIGN PATENT DOCUMENTS

| DE | 10 2016 222527 A1 | 5/2018 |
| EP | 3 348 434 A1 | 7/2018 |
| EP | 3 348 435 A1 | 7/2018 |

OTHER PUBLICATIONS

EP 3348434 A1 "Method for Monitoring a Drive System, in Particular a Drive Train of an Electric Vehicle, and Control Device Operating According To This Method" Inventor: Wiedmann (Year: 2018).*

(Continued)

*Primary Examiner* — Jorge L Carrasquillo
(74) *Attorney, Agent, or Firm* — Michael D. Lazzara; Leech Tishman Fuscaldo & Lampl, LLC

(57) ABSTRACT

A control method of an electric machine is described, including a first step of detecting the angular position of a rotor of the electric machine; a second step of detecting the values of the alternate current next to at least two phases of the input current to the electric machine; a third step of detecting the values of voltage and direct current supplied as input to the inverter by the electric supply means; a fourth step of estimating the torque supplied by the electric machine performed by processing data detected in the first and second step; a fifth step of computing the torque supplied by the electric machine performed by processing data detected in the third and first step; a sixth step of comparing the value of the computed torque and the value of the estimated torque; a control system and a motor comprising such system are further described.

7 Claims, 1 Drawing Sheet

(51) Int. Cl.
*H02P 21/20* (2016.01)
*H02P 21/22* (2016.01)
*H02P 27/06* (2006.01)

(58) Field of Classification Search
USPC ........................................................ 318/432
See application file for complete search history.

(56) References Cited

OTHER PUBLICATIONS

EP 3348435 A1 "Method for Monitoring an Electric Device in a Power Transmission of an Electric Vehicle and Control Unit Operating According To This Method" Inventor: Wiedmann (Year: 2018).*

European Patent Office, International Search Search Report issued in parent International Patent Application No. PCT/IT2019/000122, dated Sep. 24, 2020; 3 pages.

European Patent Office, Written Opinion of the International Searching Authority issued in parent International Patent Application No. PCT/IT2019/000122, dated Sep. 24, 2020, 6 pages.

* cited by examiner

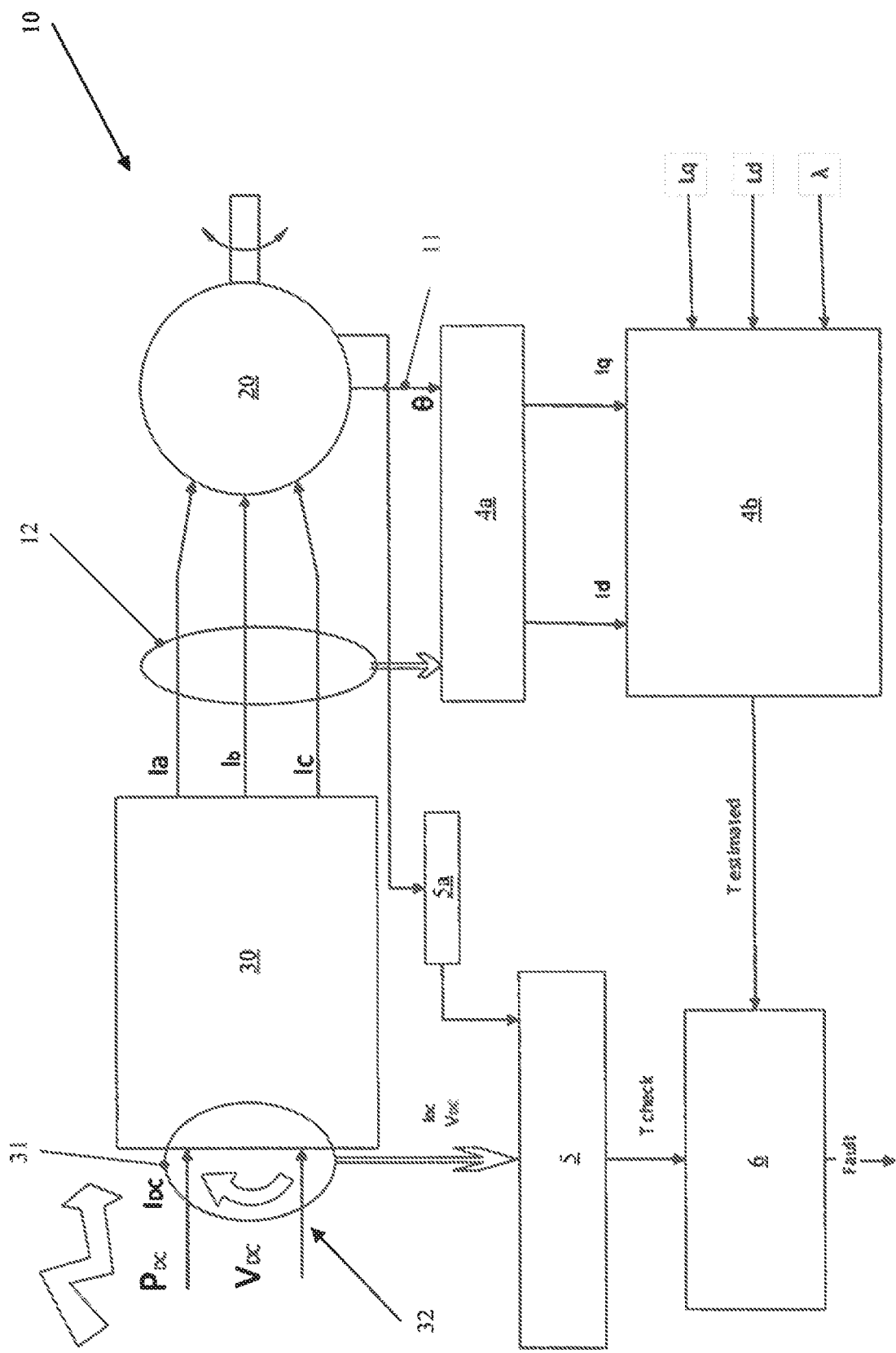

METHOD AND SYSTEM FOR CONTROLLING AN ELECTRIC MACHINE

CROSS-REFERENCE TO RELATED APPLICATION

The present Application is a national stage of International Patent Application No. PCT/IT2019/000122 titled "Method and System for Controlling an Electric Machine," filed Dec. 31, 2019, the contents of which are incorporated herein by reference in their entirety.

BACKGROUND OF THE INVENTION

The present invention refers to a method and to a system for controlling an electric machine.

In particular, the invention refers to a control method and to a control system of the torque of an electric machine, more in particular a synchronous reluctance electric machine, of the type with permanent magnets, but can be used with any type of electric machine.

In electric machines, and in particular in high-performance electric motors with permanent magnets, an important parameter which must be controlled is given by the torque supplied as output from the machine.

In order to control the torque, a method is known for estimating the value of the torque supplied by the electric machine, by using: the measure of the angular position of the rotor detected with a position sensor, and the value of the three-phase electric power computed using current values measured by current sensors, next to the steps of the electric supply circuit of the electric machine.

Such known methods for controlling the torque supplied by an electric machine have the problem that they do not allow verifying the presence of errors in the computed torque value, which can be caused by reading errors of position and current sensors, which would bring about a wrong estimation of the torque value supplied by the electric machine, in particular by the motor, with following driving errors.

SUMMARY OF THE INVENTION

An object of the present invention is obtaining a method and a system for controlling an electric machine which allow verifying the value of the torque supplied by the electric machine, detecting the presence of possible errors.

The above and other objects and advantages of the invention, as will result from the following description, are obtained with a method and a system for controlling an electric machine as claimed in the independent claims.

Preferred embodiments and non-trivial variations of the present invention are the subject matter of the dependent claims.

It is intended that all enclosed claims are an integral part of the present description.

It will be immediately obvious that numerous variations and modifications (for example related to shape, sizes, arrangements and parts with equivalent functionality) can be made to what is described, without departing from the scope of the invention, as appears from the enclosed claims.

DETAILED DESCRIPTION OF PREFERRED EMBODIMENTS

The present invention will be better described by some preferred embodiments thereof, provided as a non-limiting example, with reference to the enclosed drawings, in which:

FIG. 1 shows a schematic view of a system and of the control method of an electric machine according to the invention.

With reference to the FIGURE, the control method of an electric machine 20, preferably a high-performance electric motor with permanent magnets, of the invention comprises the following steps:

a first step of detecting the angular position $\ominus$ of a rotor of the electric machine 20 through a position sensor 11 of a known type, for example an encoder or a resolver;

a second step, simultaneous with the first step, of detecting the values of the alternate current $i_a$, $i_b$, $i_c$ next to at least two phases of the input current to the electric machine 20 through at least two alternate current sensors 12, each of said alternate current sensors 12 being electrically connected to a phase of the supplying circuit of the electric machine 20, in turn electrically connected to an inverter 30 configured to transform a direct voltage supplied by electric supply means into an alternate voltage for supplying power to the electric machine 20;

a third step, simultaneous with the first and the second step, of detecting the values of the direct voltage $V_{DC}$ and of the direct current ipc supplied as input to the inverter 30 by the electric supply means, respectively through a direct voltage sensor 32 and a direct current sensor 31 electrically connected to the supplying circuit of the inverter 30;

a fourth step of estimating the torque $T_{estimated}$ supplied by the electric machine 20, performed by processing, preferably through an information program executed by a microprocessor, data detected by the position sensors 11, and the alternate current sensors 12 in the first and in the second step, and data obtained by means of known simulations of the electric machine 20;

a fifth step 5 of computing the torque $T_{check}$ supplied by the electric machine 20 performed by processing, preferably through an information program executed by a microprocessor, data detected by the direct current sensor 31, the direct voltage sensor 32 (anyway necessary and present for controlling the machine) and the position sensor 11 from which the rotation speed is obtained (through processing from an information program) respectively in the previous third and first steps, and parameters of the electric machine 20;

a sixth step 6 of comparing the value of the torque $T_{eheek}$ computed in the fifth step 5 and the value of the torque $T_{estimated}$ estimated in the fourth step, to verify that the difference between the two values is lower than a pre-set value, for example not greater than 10% or 10 Nm (taking into account that usually the required accuracy for controlling the torque $T_{estimated}$ is 5% or 5 Nm).

In a preferred way, in the fifth step 5, computing of the torque $T_{check}$ supplied by the electric machine 20 is performed by using the following formula:

$$T_{check} = \frac{P_{DC} \cdot \eta}{\omega}$$

wherein:

$\omega$ is the speed of the rotor of the electric machine 20 computed in a first sub-step 5a starting from the angular position $\ominus$ of the rotor of the electric machine 20 detected by the position sensor 11; $P_{DC}$ is the value of the power supplied to the electric machine 20 by the electric supply means, for example by the battery, obtained in a known way by multiplying the voltage $V_{DC}$ supplied by the electric supply means for the current $i_{DC}$ detected by the direct current sensor 31 in the third step, and η is the efficiency of the electric machine 20.

In particular, the efficiency of the electric machine is known, since it can be computed with specific bench tests, and afterwards it can be tabulated in order to be used by the information program.

Preferably, the fourth step of estimating the torque $T_{estimated}$ supplied by the electric machine 20 comprises a first sub-step 4a wherein, using known Clarke Park transforms, direct current $i_d$ and quadrature current $i_q$ are computed.

In a preferred way, if the electric machine 20 is a synchronous motor with permanent magnets, the fourth step further comprises a second sub-step 4b wherein the estimation of the torque $T_{estimated}$ supplied by the electric machine 20 is performed by using the following formula, in the reference rotating system synchronous with the rotor:

$$T_{estimated} = \frac{3}{2} \cdot p \cdot i_q \cdot (\lambda + (L_d - L_q) \cdot i_d)$$

wherein:

p is the number of polar torques of the motor, $i_d$ and $i_q$ are respectively the direct current and the quadrature current computed in the first sub-step 4a, $L_d$ is the direct inductance where the direct current is passes, and $L_q$ is the quadrature inductance where th quadrature current $i_q$ passes, λ is the concatenated flow, produced by the rotor permanent magnets and concatenated by the stator windings.

The system 10 for controlling an electric machine 20, preferably a high-performance electric motor with permanent magnets, of the invention comprises: a position sensor 11 of a known type, for example an encoder or a resolver, configured to detect the angular position of a rotor of the electric machine 20; at least two alternate current sensors 12, each of said alternate current sensors 12 being configured to detect the value of the alternate current $i_a$, $i_b$, $i_c$ next to an input phase to the electric machine 20, and electrically connected to a phase of the supplying circuit of the electric machine 20, in turn electrically connected to the inverter 30 configured for transforming a direct voltage supplied by the electric supply means into an alternate voltage for supplying power to the electric machine 20; a direct voltage sensor 32 and a direct current sensor 31 configured to respectively detect the direct voltage $V_{DC}$ and the direct current ipc supplied by the electric supply means, for example a battery, as input to the inverter 30.

The system 10 for controlling an electric machine 20 of the invention further comprises an electronic control unit of a known type, comprising a microprocessor and memory means, configured to process, through suitable information programs, data detected by the sensors and drive the electric machine 20 to perform the previously described control method of the invention.

The invention further comprises a high-performance electric motor with permanent magnets comprising the previously described control system 10.

The invention claimed is:

1. A control method of an electric machine comprising the following steps:
   a first step of detecting an angular position of a rotor of the electric machine;
   a second step, simultaneous with the first step, of detecting values of alternate current next to at least two phases of an input current to the electric machine electrically connected to an inverter;
   a third step, simultaneous with the first step and the second step, of detecting values of voltage and direct current supplied as input to the inverter by electric supply means;
   a fourth step of estimating an estimated torque supplied by the electric machine performed by processing data detected by position sensors, and the values of alternate current in the first step and in the second step, and data obtained by means of simulations of the electric machine;
   a fifth step of computing a check torque supplied by the electric machine performed by using the following formula:

$$T_{check} = \frac{P_{DC} \cdot n}{\omega}$$

wherein ω is the speed of the rotor of the electric machine computed in a first sub-step starting from the angular position of the rotor of the electric machine detected by the position sensor, $P_{DC}$ is the value of the power supplied to the electric machine by the electric supply means, and n is the efficiency of the electric machine; and
   a sixth step of comparing the value of the check torque computed in the fifth step and the value of the estimated torque estimated in the fourth step.

2. The control method according to claim 1, wherein:
   the first step of detecting the angular position of the rotor of the electric machine is performed through the position sensors;
   the second step of detecting the values of alternate current next to at least two phases of the input current to the electric machine is performed through at least two alternate current sensors, each the at least two alternate current sensors being electrically connected to a phase of a supplying circuit of the electric machine;
   the third step of detecting the values of voltage and direct current supplied as input to the inverter is performed respectively through a direct voltage sensor and a direct current sensor, electrically connected to the supplying circuit of the inverter;
   the fourth step of estimating the estimated torque supplied by the electric machine is performed by processing data detected by the position sensors, and the values of the alternate current in the first step and in the second step, and data obtained by means of simulations of the electric machine;
   the fifth step of computing the check torque supplied by the electric machine is performed by processing data detected by the direct voltage sensor, by the direct current sensor and by the position sensors, respectively, in the previous third step and first step, and parameters of the electric machine; and
   in the sixth step, a comparison is performed between the check torque value computed in the fifth step and the estimated torque value estimated in the fourth step, to verify that a difference between the two values is lower than a pre-set value.

3. The control method according to claim 1, wherein the fourth step of estimating the estimated torque supplied by the electric machine comprises a first sub-step of the fourth step wherein the direct current and a quadrature current are computed.

4. The control method according to claim 3, wherein, if the electric machine is a synchronous motor with rotor permanent magnets, the fourth step further comprises a second sub-step of the fourth step, wherein the estimation of the torque supplied by the electric machine is performed by using a second formula, in a reference rotary system $$T_{estimated} = \frac{3}{2} \cdot p \cdot i_q \cdot (\lambda + (L_d - L_q) \cdot i_d)$$

synchronous with the rotor, the second formula being:

$$T_{estimated} = \frac{3}{2} \cdot p \cdot i_q \cdot (\lambda + (L_d - L_q) \cdot i_d)$$

wherein p is a number of polar torques of the motor, $i_d$ and $i_q$ are respectively the direct current and the quadrature current computed in the first sub-step of the fourth step, $L_d$ is a direct inductance in which the direct current $i_d$ passes, and $L_q$ is a quadrature inductance in which the quadrature current $i_q$ passes, $\lambda$ is a concatenated flow produced by the rotor permanent magnets and concatenated by stator windings.

5. A high-performance electric motor with permanent magnets comprising a system for controlling an electric machine according to claim 1.

6. A system for controlling an electric machine comprising:
- a position sensor configured to detect an angular position of a rotor of the electric machine;
- at least two alternate current sensors, each configured to detect an alternate current value next to an input phase to the electric machine, and electrically connected to a phase of a supplying circuit of the electric machine, in turn electrically connected to an inverter;
- a direct voltage sensor and a direct current sensor configured to respectively detect a voltage and a direct current supplied by electric supply means as input to the inverter; and
- an electronic control unit comprising a microprocessor and memory means and configured to process, through suitable information programs, data detected by the sensors and drive the electric machine to perform a control method, the control method comprising:
  - a first step of detecting an angular position of a rotor of the electric machine;
  - a second step, simultaneous with the first step, of detecting values of alternate current next to at least two phases of an input current to the electric machine electrically connected to an inverter;
  - a third step, simultaneous with the first step and the second step, of detecting values of voltage and direct current supplied as input to the inverter by electric supply means;
  - a fourth step of estimating an estimated torque supplied by the electric machine performed by processing data detected by position sensors, and the values of alternate current in the first step and in the second step, and data obtained by means of simulations of the electric machine;
  - a fifth step of computing a check torque supplied by the electric machine performed by using the following formula:

$$T_{check} = \frac{P_{DC} \cdot n}{\omega}$$

wherein $\omega$ is the speed of the rotor of the electric machine computed in a first sub-step starting from the angular position of the rotor of the electric machine detected by the position sensor, $P_{DC}$ is the value of the power supplied to the electric machine by the electric supply means, and n is the efficiency of the electric machine; and
  - a sixth step of comparing the value of the check torque computed in the fifth step and the value of the estimated torque estimated in the fourth step.

7. A high-performance electric motor with permanent magnets comprising a system for controlling an electric machine according to claim 6.

* * * * *